United States Patent Office 2,767,226
Patented Oct. 16, 1956

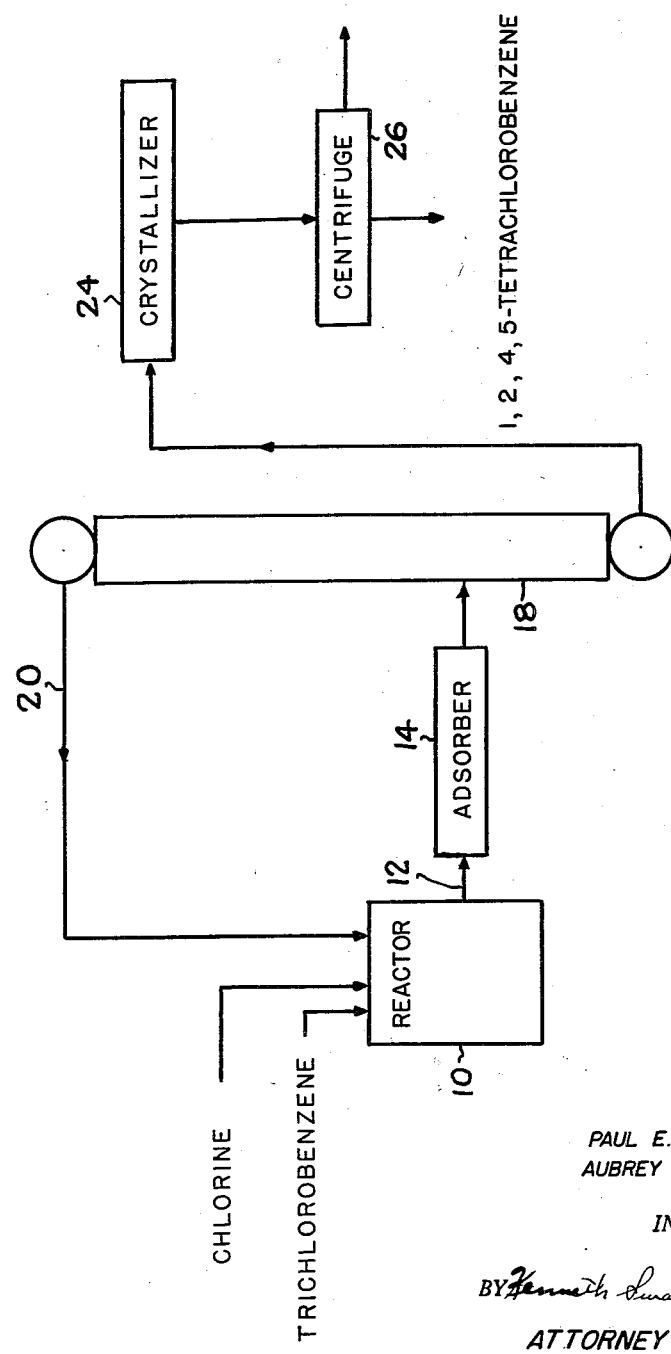

2,767,226

PURIFICATION OF CHLORINATED BENZENES

Paul E. Weimer and Aubrey L. Hanna, Baton Rouge, La., assignors to Ethyl Corporation, New York, N. Y., a corporation of Delaware Application August 19, 1952, Serial No. 305,254

2 Claims. (Cl. 260—650)

This invention relates to the purification of chlorinated hydrocarbons such as benzenes, more particularly with the recovery of purified chlorinated benzenes from crude reaction mixtures in which they are formed.

In the formation and handling of chlorinated benzenes in ferrous equipment, or in the presence of iron compounds, it appears that some metal becomes dissolved in the chlorinated material in proportion sufficient to strongly discolor the compounds, as well as to leave an appreciable residue where these compounds are to be evaporated or distilled. This is particularly significant with the polychlorinated benzenes such as di-, tri-, tetra-, penta- and hexachlorobenzenes. The discoloring and contaminating ingredients cannot be removed by the ordinary filtration processes and are therefore believed not to be in the form of suspended particles. Whereas a distillation step would separate the chlorinated materials from the contaminants, the contaminants interfere with the distillation and also build up in the distillation equipment to such an extent as to require frequent cleaning so that the distillation step becomes too awkward and expensive.

Among the objects of the present invention is the provision of a purification and recovery technique which avoids the above and related disadvantages. Additional objects of the present invention include the provision of recovery techniques for obtaining a purified polychlorinated benzene such as 1,2,4,5-tetrachlorobenzene from a reaction mixture that introduces metallic contaminants.

The above as well as still further objects of the present invention will be more clearly understood from the following description of several of its exemplifications in connection with the accompanying drawing which schematically shows a process for making 1,2,4,5-tetrachlorobenzene in accordance with the present invention.

It has been discovered that dissolved metallic contaminants can be readily removed from chlorinated benzenes by contacting these materials in liquid form with a finely divided adsorbing agent. The contacting need not be effected as a filtration through a bed of adsorbent, although such technique can be used to provide a more thorough contacting of the adsorbent with all portions of the chlorinated material.

Turning now to the drawing, the process of the present invention will be described in connection with the preparation of tetrachlorobenzene by chlorinating trichlorobenzene.

At 10 is shown a reactor into which is introduced, either continuously or intermittently, separate streams of chlorine and trichlorobenzene. The reactor 10 is preferably made with a relatively inert reaction contacting surface such as nickel or Monel metal, and can advisedly also contain a reaction catalyst such as iron particles, ferric chloride, other iron compounds, aluminum, aluminum halides, and the elements antimony, bismuth, tin, selenium, tellurium and halides and oxyhalides thereof. Common iron nails make highly effective catalysts. The trichlorobenzene is conveniently an isomeric mixture containing an appreciable amount of the 1,2,4-isomer, as produced for example by the dehydrohalogenation of any of the stereoisomeric forms of benzene hexachloride or of mixtures of these isomers with or without other ingredients such as dichlorobenzenes.

The reaction mixture is maintained in the reactor at a temperature anywhere within the range of from 20° to 350° C., a vent (not shown) being provided to permit the escape of HCl formed by the chlorination, and the proportion of reactants introduced is adjusted to about 0.1 to 0.6 part by weight of chlorine for every part by weight of trichlorobenzene. The chlorine introduction is very effective when made below the surface of the liquid feed, as by means of a tube having a fritted glass outlet. After a dwell that may extend from about half an hour to three hours the reactants are removed through conduit 12 and passed through an adsorber 14 in which is contained a body of finely divided clay such as kaolin powder. Most of the catalyst used in the reactor will remain behind inasmuch as the catalysts are generally solid or liquid particles denser than the reaction mixture and settle out quite readily. If desired, however, a mechanical filter screen or settling space can be provided to separate out additional quantities of the catalyst. Where a filtration is used it is advisable to make sure the withdrawn reaction mixture is at a temperature below the melting point of the catalyst so as to assure that the catalyst particles are solid and will be properly filtered off.

During the reaction the catalyst, though still present, may show a drop in efficiency after about 10 to 15 hours. Additional quantities of catalyst can then be added to bring the chlorine efficiency back to near 100 percent.

The reaction mixture emerging from the reactor should be kept liquid in the adsorber, and only a few minutes, in some cases as little as 0.1 minute, is required to cause the adsorber to remove from the reaction mixture most of the contaminants. Ordinarily, 30 minutes contact time is sufficient to treat even the most recalcitrant material, but longer contact times can be employed if desired. The liquid mixure is then moved from the adsorber into a distilling column 18 in which the mixture is separated into a light fraction containing substantially the unreacted trichlorobenzenes, and a heavy fraction or bottoms of the halogenated products. The unreacted trichlorobenzene is returned from the top of the column through line 20 back to the reactor 10 where it is subjected to another chlorination pass. The liquid column bottoms can be passed to a crystallizer 27 in which this product is cooled to the point where 1,2,4,5-tetrachlorobenzene crystallizes out from the mother liquor. The crystals are then easily separated by means of centrifuge 26 which whirls the liquid away from the crystallized material.

The chlorination reaction by itself is more completely described in the copending Ligett application, Serial No. 234,674, filed June 30, 1951, and any of the reaction techniques disclosed there can be used in accordance with the present invention. However, after the reaction is completed, the reaction mixture invariably contains dissolved iron or other metal usually to the extent of more than 0.001 percent or 0.0015 percent by weight. Although this content of contaminants appears to be low, it effects serious discoloration of the product. More seriously, it rapidly builds up a deposit when the contaminated material is distilled, and in a very short time can completely clog up the distilling apparatus and thus render it inoperable.

After the adsorption treatment, the metal content drops to about 0.00005 percent by weight, or below. This contaminant concentration is so low that distillation will operate without appreciable difficulty, and the final product is of a light color.

The distillation in column 18 proceeds very effectively at about 220° C. or slightly higher at atmospheric pressure. However, at reduced or increased pressures the distillation temperature is correspondingly varied. The final crystalline material produced in accordance with the illustrated process is more than 95 percent by weight 1,2,4,5-tetrachlorobenzene, the balance being other isomeric forms of tetrachlorobenzene.

The above described adsorbption operates extremely effectively with other clays in place of the kaolin. Thus, for example, activated clay or any of the commercial clay type filter aids are of about equal efficiency as the kaolin, and will be sufficient to treat 700–800 times its weight of reactor effluent having 0.00248 weight percent of iron. In addition, finely divided carbon, such as gas carbon and bone charcoal powder can be substituted for the clay with about the same results. Other finely divided materials found to be very suitable are silica gel, calcium hydroxide, magnesium oxide, calcium oxide and calcium carbonate. Apparently, any finely divided solid will operate to remove the contaminants, although not with the extreme efficiency shown by the above listed materials.

The adsorption is also extremely useful in the handling or purification of other chlorinated benzenes such as the polychlorinated benzenes listed above. For example, pentachlorobenzene and/or hexachlorobenzene can be made in exactly the same way as that shown above, except for an increase in the proportion of chlorine in the reaction and a corresponding change in the distillation temperature. The lower chlorinated benzenes can be similarly made using a benzene or a chlorobenzene as the starting material. With each of these materials a considerable decrease is discoloration and distillation difficulties is very simply effected.

A feature of the present invention is the fact that the adsorption treatment before the distillation will not only simplify the distillation, but it will keep the desired ingredient from appreciably darkening, decomposing, tarring up or other wise being impaired by reason of the high temperature treatment it undergoes as the distillation bottoms. Notwithstanding this treament, when the metal content is first lowered in accordance with the present invention, the final product is as pure as can be desired.

In other words, the desired material can be recovered in almost uncolored form without having to distill it over as a vapor and then having to condense the vapor. A very considerable saving is accordingly made.

Where additional purity is desired, the crystallization can be carried out at temperatures of about 50° C. or even higher, although this lowers the yield. Crystallization at lower temperatures down to 10° C. gives better yields and a very high purity if the crystallized centrifuged product is washed with a small quantity of solvent such as methanol or benzene. An amount of methanol equal in weight to that of the impurities raises the final purity to about 95 percent, and a 98 to 99 percent purity is obtained with about three times the amount of wash solvent.

As many apparently widely different embodiments of the invention may be made without departing from the spirit and scope hereof it is to be understood that the invention is not limited to the specific embodiments hereof except as defined in the appended claims.

We claim:

1. A method of preparing essentially colorless tetrachlorobenzene comprising chlorinating trichlorobenzene at a temperature between about 20°–350° C. in the presence of an iron catalyst to form a crude liquid containing tetrachlorobenzene, having above about 0.001 percent dissolved iron, contacting this liquid for a period of at least 0.1 minute with a finely divided adsorbent clay, to reduce the dissolved iron content thereof to below about 0.00005 percent by weight, separating the liquid from the clay, and thereafter distilling the lighter boiling materials from the removed liquid to separate a concentrated tetrachlorobenzene fraction.

2. The method of claim 1 in which the concentrated tetrachlorobenzene fraction is thereafter cooled to crystallize a purified tetrachlorobenzene and is recovered as a crystallized product from the remainder of the cooled fraction.

References Cited in the file of this patent

UNITED STATES PATENTS

| 1,934,675 | Mills | Nov. 7, 1933 |

FOREIGN PATENTS

| 420,520 | Great Britain | Nov. 26, 1934 |
| 440,136 | Great Britain | Dec. 20, 1935 |